(12) United States Patent
Itoh et al.

(10) Patent No.: US 7,910,037 B2
(45) Date of Patent: Mar. 22, 2011

(54) FUEL CELL MANUFACTURING METHOD AND SYSTEM

(75) Inventors: Yuichi Itoh, Nisshin (JP); Nobuhira Abe, Nishikamo-gun (JP); Satoshi Ohnuma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1246 days.

(21) Appl. No.: 10/557,337

(22) PCT Filed: Dec. 21, 2004

(86) PCT No.: PCT/IB2004/004236
§ 371 (c)(1),
(2), (4) Date: Nov. 21, 2005

(87) PCT Pub. No.: WO2005/067085
PCT Pub. Date: Jul. 21, 2005

(65) Prior Publication Data
US 2007/0102846 A1    May 10, 2007

(30) Foreign Application Priority Data
Dec. 26, 2003  (JP) ................................ 2003-434045

(51) Int. Cl.
| | |
|---|---|
| *B28B 3/06* | (2006.01) |
| *B29C 69/00* | (2006.01) |
| *H01M 2/14* | (2006.01) |
| *H01M 2/16* | (2006.01) |
| *H01M 4/82* | (2006.01) |
| *H01M 6/00* | (2006.01) |
| *H01M 8/10* | (2006.01) |

(52) U.S. Cl. ...................... 264/297.8; 264/241; 429/129; 429/135; 429/143; 429/147; 429/152; 29/623.1

(58) Field of Classification Search .................... 429/34, 429/457, 507–511, 535; 29/623.1
See application file for complete search history.

(56) References Cited

U.S. PATENT DOCUMENTS
3,621,543 A * 11/1971 Willmann et al. .................. 29/2
(Continued)

FOREIGN PATENT DOCUMENTS
CA    2 360 575    5/2001
(Continued)

OTHER PUBLICATIONS

Aug. 17, 2010 German Office Action issued in German Patent Application No. 11 2004 000 776 with English translation.

*Primary Examiner* — Ula C Ruddock
*Assistant Examiner* — Amanda Barrow
(74) *Attorney, Agent, or Firm* — Oliff & Berridge, PLC (57) ABSTRACT

A fuel cell manufacturing method is provided by which an unbroken strip of sheet material is sent through a molding process, an MEA assembly process and a modularization process, and is separated into individual modules in a batch process. In the molding process, separators are sequentially molded on the strip of sheet material, and a separator strip is produced in which the separators are connected together by runners. In the MEA assembly process and the modularization process, MEAs are sequentially assembled on the separator strip in which a series of the separators are connected together by the runners, and a module strip is produced in which a series of the modules are connected together by the runners. In the batch process, the series of modules is separated into the individual modules by cutting and removing the runners from the module strip.

14 Claims, 9 Drawing Sheets

U.S. PATENT DOCUMENTS

| | | | |
|---|---|---|---|
| 5,856,038 A * | 1/1999 | Mason | 429/97 |
| 5,987,704 A * | 11/1999 | Tang | 16/354 |
| 6,291,091 B1 * | 9/2001 | Preischl et al. | 429/30 |
| 6,613,106 B1 | 9/2003 | Debe et al. | |
| 6,740,131 B2 * | 5/2004 | Schukar et al. | 29/623.1 |
| 6,756,146 B2 * | 6/2004 | Mlinar et al. | 429/535 |
| 2002/0039675 A1 | 4/2002 | Braun et al. | |
| 2002/0086196 A1 * | 7/2002 | Utsunomiya et al. | 429/34 |
| 2002/0134501 A1 | 9/2002 | Fan et al. | |
| 2003/0134175 A1 * | 7/2003 | Karichev | 429/38 |
| 2003/0219646 A1 * | 11/2003 | LeCostaouec | 429/44 |
| 2003/0232246 A1 * | 12/2003 | Laliberte et al. | 429/231.95 |

FOREIGN PATENT DOCUMENTS

| | | | |
|---|---|---|---|
| DE | 698 04 019 T2 | | 9/2002 |
| JP | A 64-27436 | | 1/1989 |
| JP | A 10-055813 | | 2/1998 |
| JP | B2-2830927 | | 12/1998 |
| JP | A 2001-196079 | | 7/2001 |
| JP | 2001-236971 | * | 8/2001 |
| JP | A 2001-236971 | | 8/2001 |
| JP | A 2002-500422 | | 1/2002 |
| JP | A 2002-190305 | | 7/2002 |
| JP | A 2002-198062 | | 7/2002 |
| JP | 2002-313354 A | * | 10/2002 |
| JP | A-2002-313354 | | 10/2002 |
| JP | A 2003-68320 | | 3/2003 |
| JP | A 2003-86232 | | 3/2003 |
| WO | WO 91/16734 | * | 10/1991 |
| WO | WO 99/34466 | | 7/1999 |

* cited by examiner

FUEL CELL MANUFACTURING METHOD AND SYSTEM

BACKGROUND OF THE INVENTION

1. Field of the Invention

The invention relates to a fuel cell manufacturing method and a fuel cell manufacturing system directly used in the implementation of the manufacturing method.

2. Description of the Related Art

A single fuel cell (single cell) is formed by sandwiching a membrane-electrode assembly (MEA) between separators. A module is formed by joining at least two single fuel cells together in a stack, and a stacked fuel cell is formed by stacking by a plurality of modules together (the direction in which they are stacked is arbitrary).

Japanese Patent Application Publication No. JP-A-2001-236971 discloses a continuous production method for a module. Although it is described as "continuous", it is no more than an example of a well-known production method, and is therefore essentially a batch process. It is not a method for producing a separator and module by conveying a continuous strip of sheet material as it is, such as is the method according to this invention.

However, the related production method for a fuel cell module has the following problems.

1) In order to reduce space and effectively use the area of the electrode, which is costly, the two separators and the MEA must generally be precisely positioned when being assembled. Also, the separator distorts significantly by itself due to the fact that it is an extremely thin sheet. Therefore, in a conventional batch automated assembly, it takes a relatively long time to perform "distortion correction" and "positioning" without damaging the product, which creates a bottleneck that slows assembly down.

2) When assembly is done while the line is stopped using a fixed jig for precision positioning or distortion correction in 1) above, conveying time increases, thus creating a bottleneck that slows assembly down. Non-stop assembly is also conceivable, such as a method in which the jig and entire assembly apparatus are mobile and assembly is done while the separator is being conveyed, after which the jig and entire assembly system then return at high speed, or a method by which a plurality of apparatuses are circulated. These methods, however, have problems related to cost and space.

3) Since the separator and the MEA are shaped in thin sheets and there is no guide, and especially since a guide can not be used because the MEA is a part which has little flexural rigidity, then during assembly, it is necessary to hold the parts with an apparatus until there is sufficient contact between them. Since the assembly tool is positioned on a jig (the product) for a relatively long time during assembly, assembly is such that the conveyer line tends to stop, just as in 2) above, so that the relatively long conveying time becomes a bottleneck that slows assembly down.

The problem that this invention attempts to solve is the fact that it takes a long time to position separators with respect to other separators and separators with respect to MEAs according to the conventional fuel cell module manufacturing method.

SUMMARY OF THE INVENTION

In view of the foregoing problems, this invention thus provides a fuel cell manufacturing method capable of quickly positioning and conveying separators with respect to other separators and MEAs with respect to separators, and a system that is directly used in that manufacturing method.

A first aspect of the invention relates to a fuel cell manufacturing method by which an unbroken strip of sheet material is molded, assembled with MEAs, modularized, and separated into individual modules, which includes a molding process of sequentially molding separators on the strip of sheet material and producing a separator strip in which the separators are connected together by runners which form outer frames of the separators; an assembling/modularizing process of sequentially assembling the MEAs on the separator strip in which a series of the separators are connected together by the runners, and producing a module strip in which a series of the modules are connected together by the runners; and a separating process of separating process of separating the series of modules into the individual modules by cutting and removing the runners from the module strip.

According to the first aspect of the invention, the series of separators with the runners still on the strip of sheet material proceeds in the molded state (i.e., in the state of the separator strip) and still connected by the runners. Furthermore, batching is performed by cutting and removing the runners after assembly of all parts is complete. Therefore, the positional relationship of each separator while the separators are being conveyed is fixed so the positional relationship of the individual separators during assembly of parts such as the MEAs is fixed. As a result, it is no longer necessary to temporarily stop the conveyer line during the assembly of parts to position the separators, which speeds up the production of the fuel cell modules.

In the first aspect of the invention, in the molding process, the separators may be molded on the strip of sheet material leaving the runners on both side edges, in the lateral direction, of the strip of sheet material, and the strip of sheet material may be conveyed downstream of the molding process while distortion in the strip of sheet material is corrected by pressing both side edges, in the lateral direction, of the runners using a roller. According to this structure, because both side edges of the runners are pressed by the roller, distortion of the strip of sheet material can be corrected without the separators being damaged as they continue to be conveyed down the line.

In the first aspect of the invention, in the molding process, the separators may be molded leaving the runners on both sides, in the lateral direction, of the strip of sheet material and conveying/positioning holes may be machined in both side edges, in the lateral direction, of the runners in precise positions with respect to the separators, and the positions of the separators downstream of the molding process can be ascertained by conveying the strip of sheet material using the conveying/positioning holes in both side edges, in the lateral direction, of the runners. According to this structure, because the conveying/positioning holes are machined in the runners on both side edges of the strip of sheet material in precise positions with respect to the separators, and these conveying/positioning holes in both side edges of the runners are used to convey the strip of sheet material downstream of the molding process, it is possible to better prevent damage to the separators, as well as handle a wider variety of separators, compared to when the manifold holes in the separators are used directly for conveying the separators.

In the first aspect of the invention, frames made of an insulating material are provided on outer edge portions of electrolyte membranes of the MEAs before the MEAs are assembled to the separator strip; and in the assembling/modularizing process, the frames are used to position the MEAs for assembly to the separator strip. According to this structure, because frames of an insulating material are provided on the outer edge portions of the electrolyte membranes of the MEAs, these frames can be used to position the MEAs on the separator strip during assembly.

In a modification of the first aspect of the invention, in the molding process, assembly guides may be molded on the strip of sheet material, and in the assembling/modularizing process, the MEAs with the frames may be assembled after being automatically positioned in predetermined positions on the separators on the strip of sheet material by guiding the outside edges of the frames by the assembly guides. According to this structure, because the assembly guides are made by cutting flaps out of the strip of sheet material and bending them up, the MEAs with the frames can be automatically positioned at the separator portions of the strip of sheet material by guiding the outer edges of the frames using the assembly guides in the MEA assembly and modularization processes. Once the frames are fitted in the assembly guides, the MEAs will not become offset in the cell plane. As a result, there is no need to stop the strip of sheet material as it is conveyed during MEA assembly.

In the first aspect of the invention, in the molding process, the runners may be provided between adjacent separators on the strip of sheet material, and a separator pitch of the runners may be adjusted using pitch adjusting portions provided so as to connect the runners together. According to this structure, because the runners are provided between adjacent separators on the strip of sheet material and the pitch adjusting portions for adjusting the separator pitch are provided on the runners between the separators, each separator is still able to be positioned and modularized even if there is a slight variation in separator pitch.

According to a modification of the first aspect of the invention, bending guide portions which have lower flexural rigidity than other portions of the runners may be provided on the runners, and the bending guide portions may be used as the pitch adjusting portions. According to this structure, because the bending guide portions, which are less rigid than other portions, are provided on the runners between the separators on the strip of sheet material, these bending guide portions can be used as the pitch adjusting portions.

According to a modification of the first aspect of the invention, the bending guide portions may be formed thinner than the runners or be provided with slit portions such that the bending guide portions bend through a 360 degree range, from +180 degrees to −180 degrees. According to this structure, because the bending guide portions are formed so that they can bend through a range of 360 degrees, from +180 degrees to −180 degrees, the module strip can easily fold like an accordion.

In the first aspect of the invention, in the molding process, the runners may be further provided on the strip of sheet material between adjacent separators as well as on both side edges, in the lateral direction, of the strip of sheet material, and a rib may be molded on the runner around the entire periphery of each of the separators. According to this structure, because the rib is molded on the runner around the entire periphery of each of the separators of the strip of sheet material in the molding process, the separators (particularly the manifold portions which have little flexural rigidity) can be protected from bending during modularization and folding, such that distortion can be reduced.

In the first aspect of the invention, in the molding process, all of the molding may be performed in a single plastic forming process using a mold. According to this structure, even if the assembly guides, assembly guide receiving means, and ribs are molded, the production time for the fuel cell module will not be increased.

In the first aspect of the invention, in the molding process, the runners may be molded on the strip of sheet material and at least one from among the positioning holes, the pitch adjusting portions, the bending guide portions, and the ribs may be provided concentrated around the runners, and in the batch process, the runners may be removed from the module. According to this structure, because the positioning holes, the bending guide portions, and the ribs for controlling distortion are molded concentrated around the runners in the molding process, and in the separating process, the runners are removed from the modules in the batch process, the shapes of the flow path grooves of the separators are not restricted by the positioning holes, the bending guide portions, or the ribs for controlling distortion. Also, if the method of this invention is used, it is not particularly necessary to change the shape of conventional separators.

In the first aspect of the invention, two strips of the sheet material may be supplied to the molding process; in the molding process, the assembly guides may be molded on one of the strips of sheet material, while assembly guide receiving means, which are holes or cutouts, may be molded in the other strip of sheet material, and conveying/positioning holes may be machined in both side edges, in the lateral direction, of the runners of both strips of sheet material; and in the assembling/modularizing process, the assembly guides of the one strip of sheet material may be inserted into the assembly guide receiving means of the other strip of sheet material such that the assembly guides are kept from interfering with the other strip of sheet material, and both strips of sheet material may be assembled facing one another with the respective conveying/positioning holes of the runners of each strip of sheet material aligned, such that modularization can be performed continuously without having to stop the two strips of sheet material being conveyed. According to this structure, because the assembly guides are molded on one of the strips of sheet material, while the assembly guide receiving means, which are holes or cutouts, are molded in the other strip of sheet material, the assembly guides can be inserted into the assembly guide receiving means when the two strips of sheet material are assembled facing each other using the conveying/positioning holes in the runners, such that modularization is able to be performed continuously without having to stop the two strips of sheet material being conveyed.

In the first aspect of the invention, one strip of the sheet material may be supplied to the molding process; in the molding process, an anode side separator and a cathode side separator may be molded alternately on the single strip of sheet material; and in the assembling/modularizing process, the MEAs may be sequentially assembled to the separator strip, and the module strip, in which the modules are stacked while connected by the runners, may be produced by folding the separator strip accordion-style. According to this structure, the module strip is able to be continuously produced and folded.

According to a modification of the first aspect of the invention, the module strip may be folded at the runners and the runners between the modules of all of the modules may all be cut off and removed together in the separating process. According to this structure, it is possible to efficiently remove the runners.

In the first aspect of the invention, the separating process may include a batching process in which the runners are gathered together and separated.

A second aspect of the invention relates to a fuel cell manufacturing system provided with, arranged in order in the direction in which a strip of sheet material is conveyed in a conveyer line of the strip of sheet material, a molding station, an assembling/modularizing station, and a separating station, which includes a mold provided at the molding station, which sequentially molds separators to the strip of sheet material leaving runners which form outer frames of the separators; an MEA assembler provided at the assembling/modularizing station, which sequentially assembles MEAs on a separator strip in which a series of the separators are connected by the runners; and a cutter provided at the separating station, which cuts and removes the runners from a module strip with the MEAs sequentially assembled to the separator strip.

According to a second aspect of the invention, because a molding station, an assembling/modularizing station, and a separating station are provided arranged in order in the direction in which a strip of sheet material is conveyed in a conveyer line of the strip of sheet material, and the strip of sheet material is conveyed between stations with the separators connected, the positional relationship of each separator while the separators are being conveyed is fixed so it is unnecessary to position each individual separator during the assembly of parts and therefore also no longer necessary to temporarily stop the conveyer line during the assembly of parts, which speeds up the production of the fuel cell modules.

DETAILED DESCRIPTION OF THE PREFERRED EMBODIMENTS

The fuel cell manufacturing method and the fuel cell manufacturing system for directly implementing that manufacturing method according to the invention will be described with reference to FIGS. 1 to 10.

Figure 5:
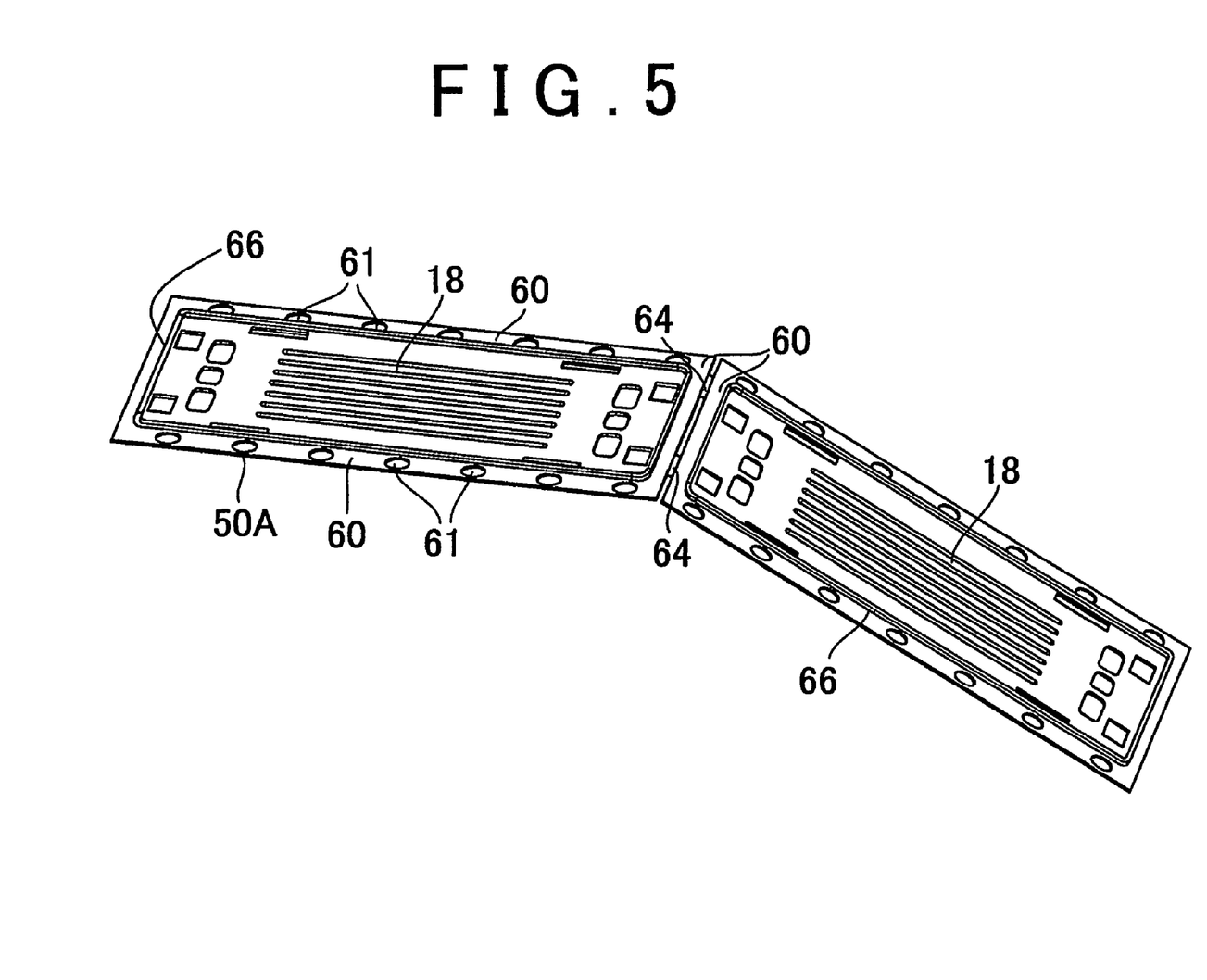
FIG. 5 is a perspective view of a bending guide and separator strip with ribs.
Figure 6:
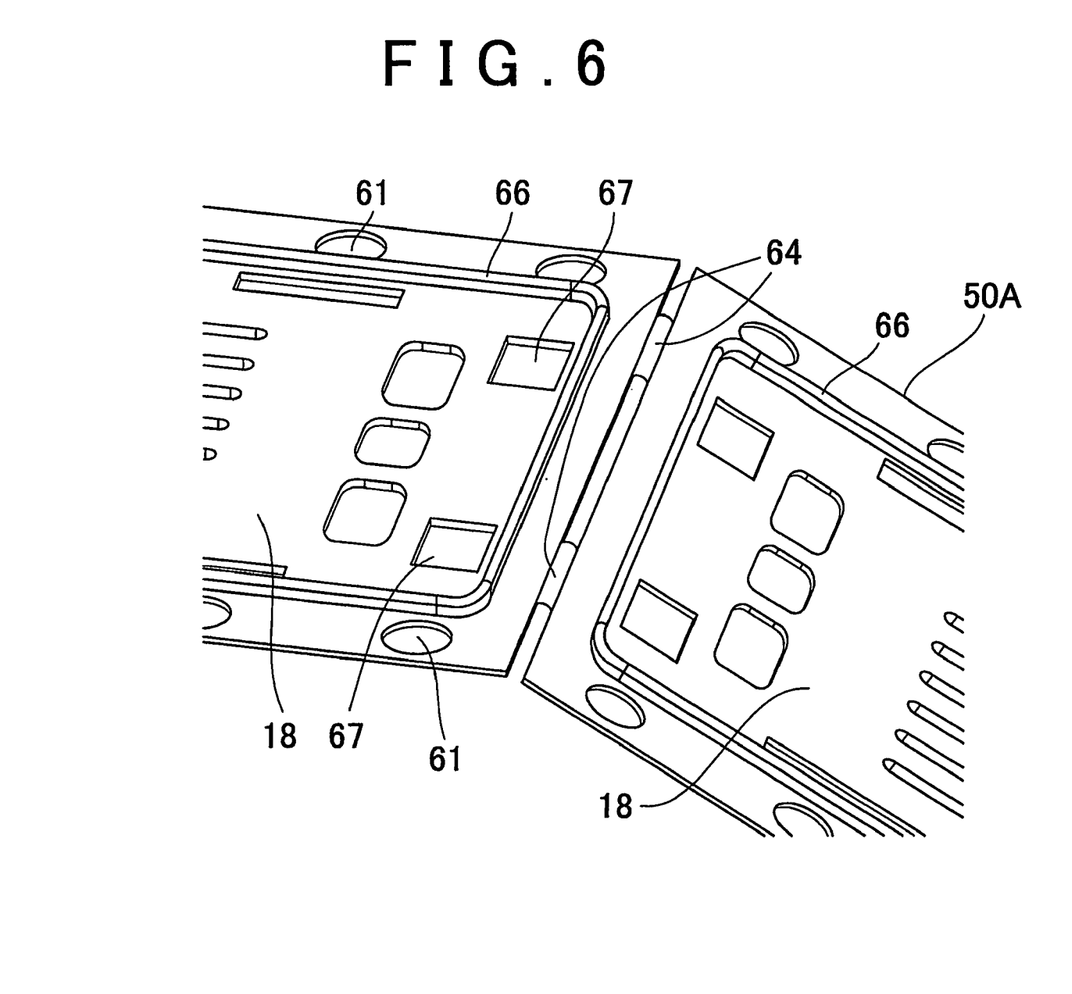
FIG. 6 is an enlarged view of a portion of the separator strip shown in FIG. 5.
Figure 7A:
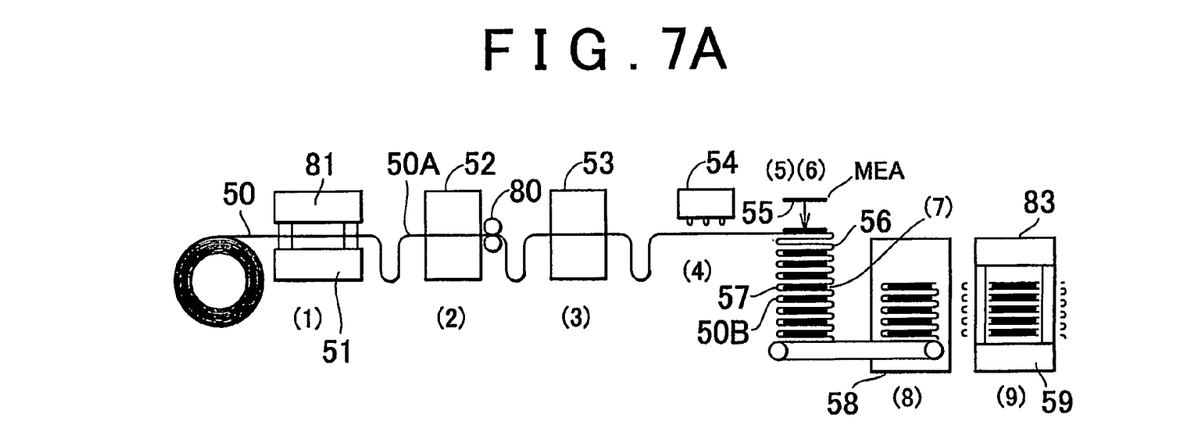
FIG. 7A is a schematic view of a system that implements a fuel cell manufacturing method according to a second exemplary embodiment of the invention.
Figure 7B:
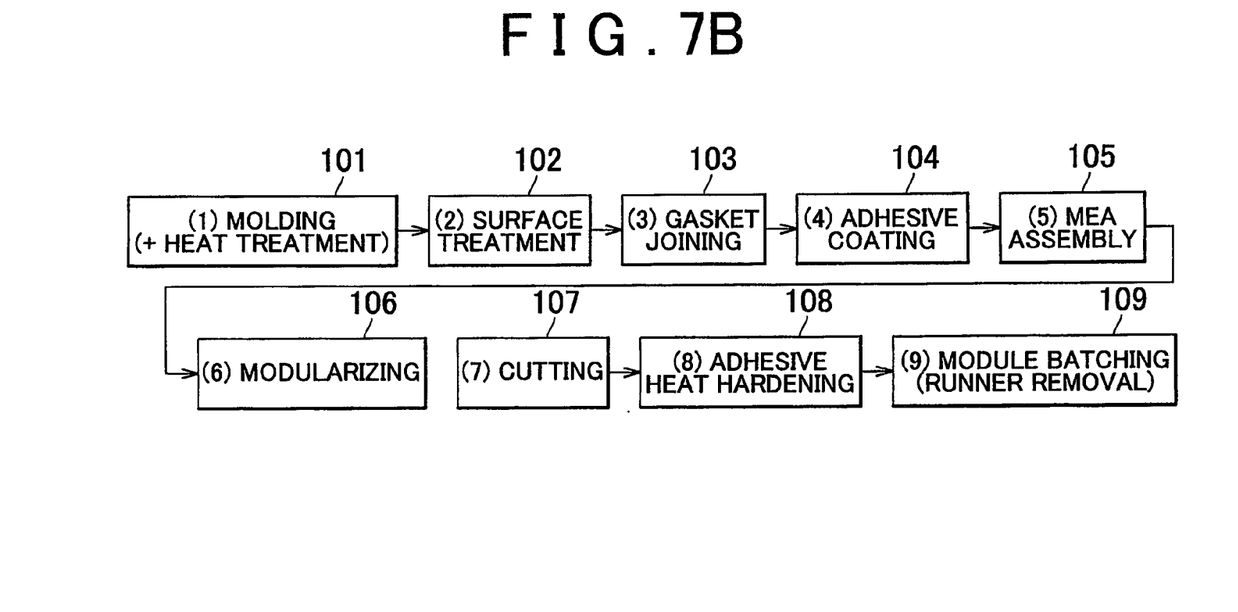
FIG. 7B is a block view of the process.
Figure 8:
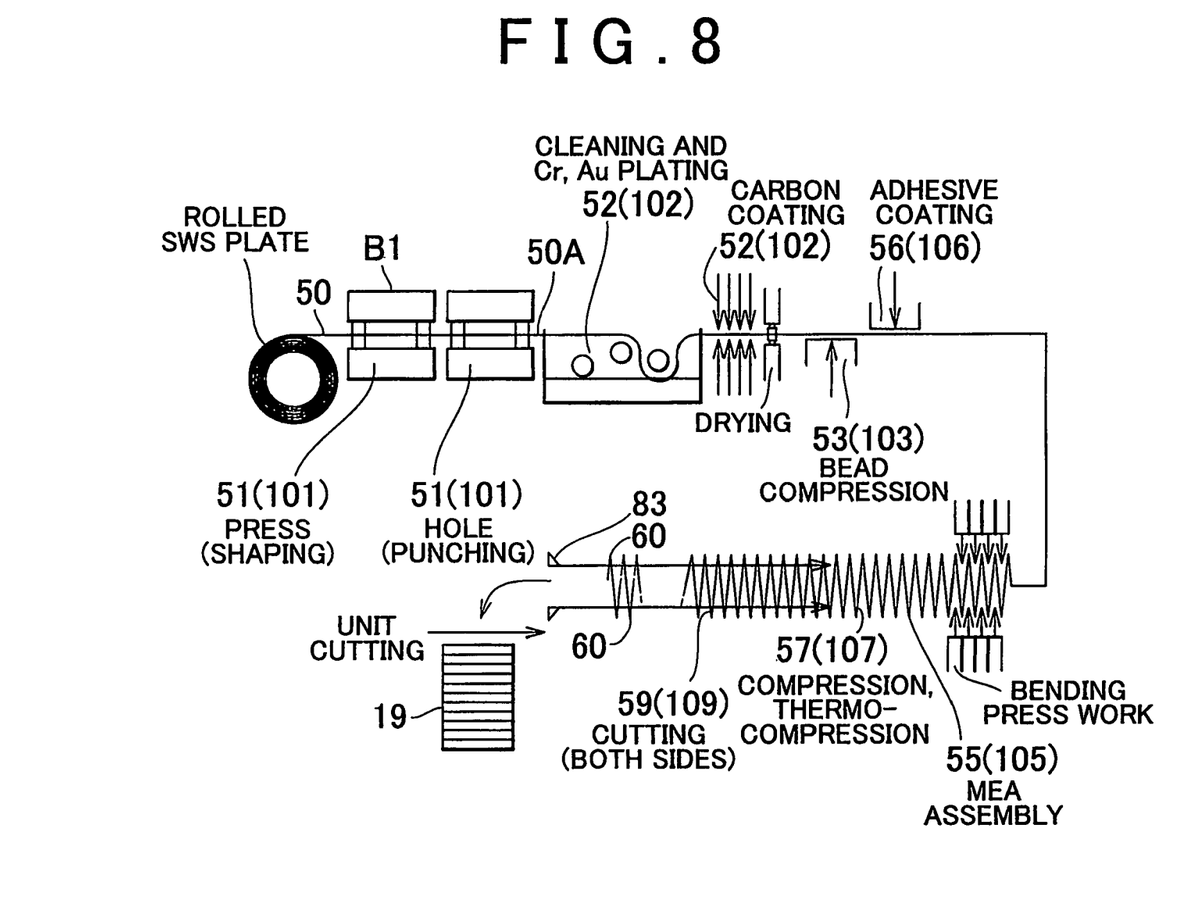
FIG. 8 is a schematic diagram of a system that implements the fuel cell manufacturing method according to a third exemplary embodiment of the invention.
Figure 9:
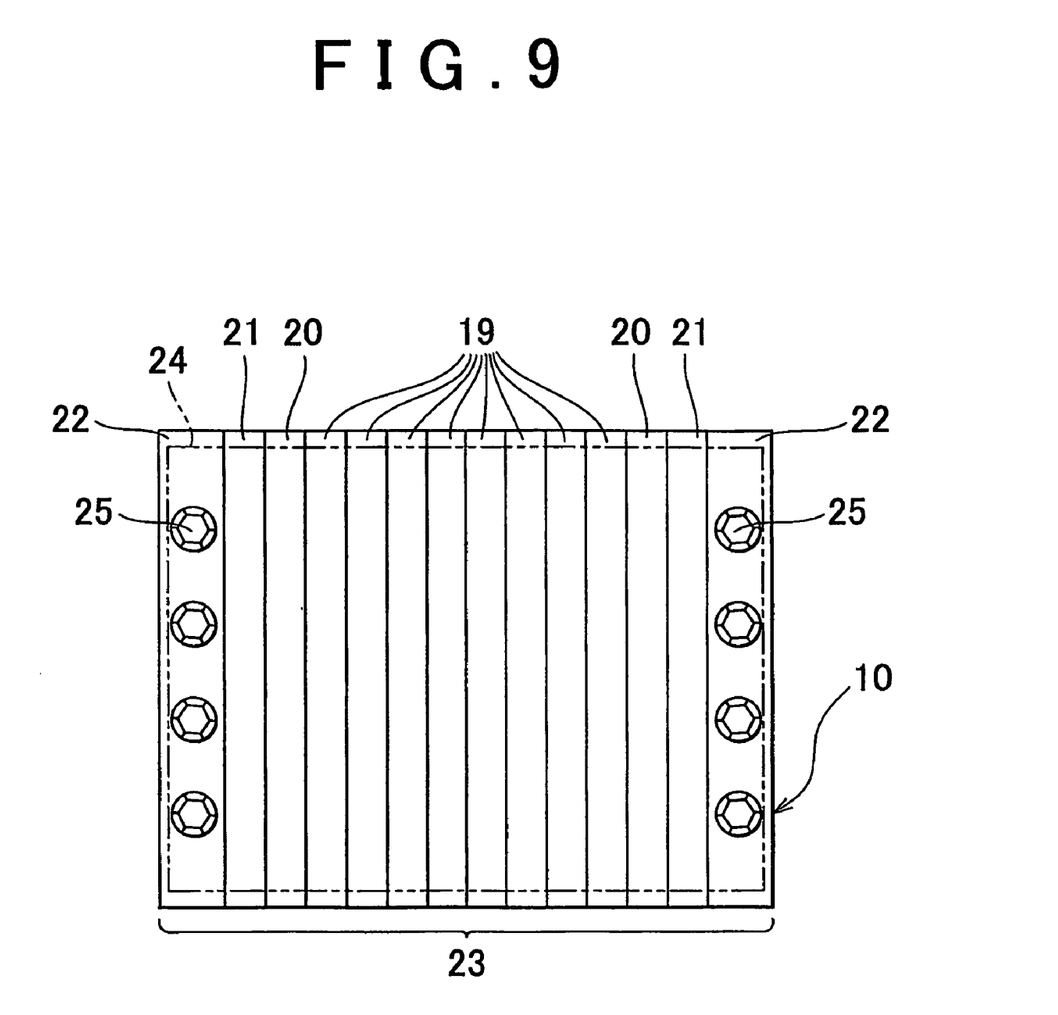
FIG. 9 is a side view of a typical fuel cell.
Figure 10:
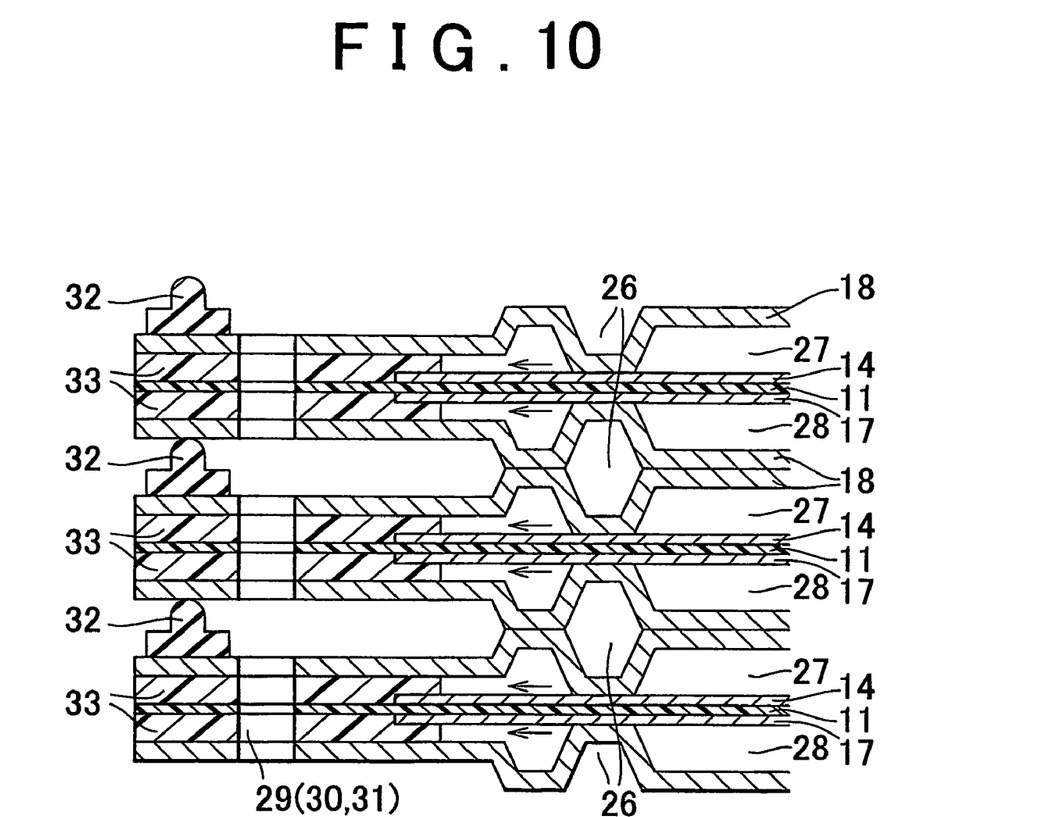
FIG. 10 is an enlarged sectional view of a portion of a typical fuel cell.

FIGS. 1 to 6 show the fuel cell manufacturing method and system according to a first exemplary embodiment of the invention. FIG. 7 shows a fuel cell manufacturing method and system according to a second exemplary embodiment of the invention. FIG. 8 shows a fuel cell manufacturing method and system according to a third exemplary embodiment of the invention. FIGS. 9 and 10 show the structure of a typical fuel cell to which any of the exemplary embodiments of the invention can be applied.

Like or similar parts in the first to the third exemplary embodiments will be referred to by the same reference numerals throughout the first to the third exemplary embodiments.

First, like or similar parts in the first to the third exemplary embodiments will be described with reference to FIGS. 1 to 6, 9, and 10, for example.

A fuel cell manufactured by the manufacturing method and system of this invention is a stacked fuel cell such as a stacked proton-exchange membrane fuel cell 10. This fuel cell 10 can be mounted in a fuel cell vehicle, for example, but is not limited to being used in a vehicle.

The proton-exchange membrane fuel cell 10 is made of a stack of membrane-electrode assemblies or MEAs and separators 18, as shown in FIGS. 9 and 10. The direction in which they are stacked is arbitrary and not limited to being vertical.

Each membrane-electrode assembly includes an electrolyte membrane 11 formed of ion-exchange membranes, an electrode (anode, fuel electrode) 14 formed of a catalyst layer arranged on one surface of the electrolyte membrane 11, and an electrode (cathode, air electrode) 17 formed of a catalyst layer arranged on the other side of the electrolyte membrane 11. A diffusion zone is provided on both the anode side and the cathode side between the membrane-electrode assembly and the separator 18.

In the separator 18 are reaction gas flow paths 27 and 28 (fuel gas flow path 27 and oxidation gas flow path 28) for supplying a fuel gas (hydrogen) and an oxidation gas (oxygen, normally air) to the anode 14 and cathode 17, and a cooling medium flow path 26 that leads a cooling medium (normally coolant) to the back side of the separator 18. In the separator 18 are also a fuel gas manifold 30 for supplying and discharging the fuel gas to and from the fuel gas flow path 27, an oxidation gas manifold 31 for supplying and discharging the oxidation gas to and from the oxidation gas flow path 28, and a cooling medium manifold 29 for supplying and discharging the cooling medium to and from the cooling medium flow path 26.

The membrane-electrode assembly and the separator 18 are stacked to form a single fuel cell (also referred to as "single cell") 19. A module is formed of at least one of these cells (FIG. 10 shows a case in which one module is made up of one cell, such that the cell 19 is equivalent to the module, so the module in this case is also denoted by the reference numeral 19. When two or more of these modules 19 are stacked together, they form a cell stack. On both ends, in the stacking direction, of the cell stack are arranged terminals 29, insulators 21, and end plates 22. The cell stack is then fastened in the stacking direction and fixed with a fastening member (such as a tension plate 24) extending in the stacking direction around the outside of the cell stack, and nuts and bolts 25, so as to form a fuel cell stack 23.

A reaction takes place at the anode side 14 of each cell 19, which splits the hydrogen into hydrogen ions (protons) and electrons. The hydrogen ions move through the electrolyte membrane 11 to the cathode 17 side, where the they combine with oxygen and electrons (the electrons produced by the anode of adjacent MEA are conducted through the separator 18 or the electrons produced by the anode of the cell on one end in the cell stacking direction make their way through an external circuit to the cathode of the cell on the other end) to form water. This reaction produces electricity.

Anode side: $H_2 \rightarrow 2H^+ + 2e^-$

Cathode side: $2H^+ + 2e^- + (1/2)O_2 \rightarrow H_2O$

The separator 18 is a bendable conductive separator such as a metal separator or a bendable sheet of resin mixed with carbon. The separator 18 may also be used together with a hard resin frame.

A gas side seal 33 and a cooling medium side seal 32 are provided between adjacent separators 18 in order to seal the fluid flow paths 26, 27, 28, 29, 30, and 31. In the example shown in the drawings, the gas side seal is shown as an adhesive and the cooling medium side seal 32 is shown as a rubber gasket, but either may be an adhesive or a rubber gasket.

Figure 1A:
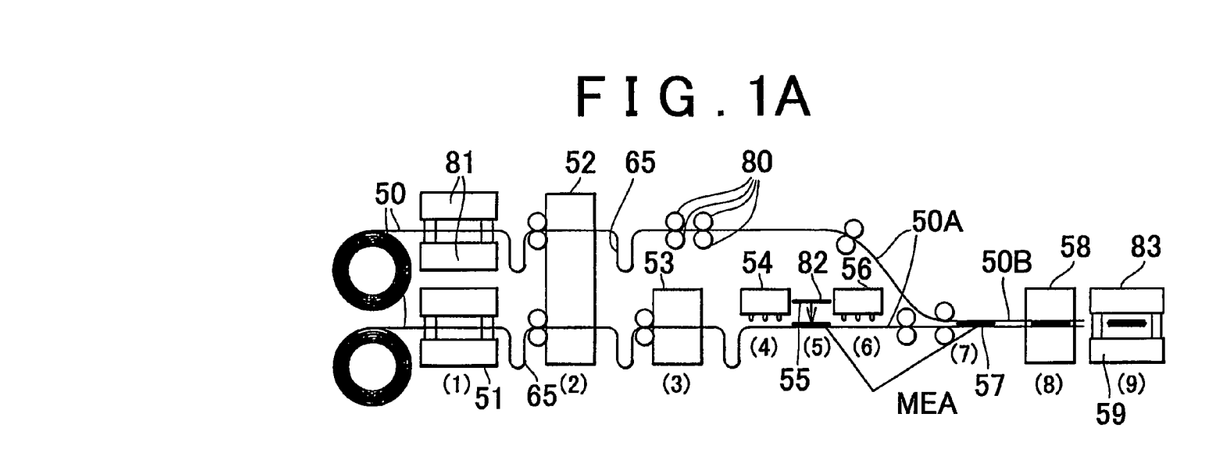
FIG. 1A is a schematic diagram of a system that implements the fuel cell manufacturing method according to a first exemplary embodiment of the invention.

The fuel cell manufacturing system of this invention is a continuous manufacturing system for the fuel cell module 19. As shown in FIG. 1, the fuel cell manufacturing system of this invention includes, in order in the direction in which the strip of sheet material 50 is conveyed in the conveyer line for the strip of sheet material 50 (i.e., the separator 18 material), a molding station 51, an MEA assembly station 55 and a modularization station 57, and a batching (separating) station 59.

More specifically, the fuel cell manufacturing system of this invention includes, in order in the direction in which the strip of sheet material 50 is conveyed in the conveyer line for the strip of sheet material 50, the molding station 51, a surface treatment station 52 for the strip of sheet material 50, a joining station 53 for joining a gasket 32 to the strip of sheet material 50, an application station 54 for applying an adhesive 33 to the strip of sheet material 50, the MEA assembly station for sequentially assembling the MEAs to predetermined positions on the strip of sheet material 50, an adhesive application station 56 for applying the adhesive 33 to the strip of sheet material 50 to which the MEAs have been assembled, a modularization station 57, an adhesive heat hardening station 58, and a batching station 59 for separating the connected modules 19 by removing runners 60.

Figure 2:
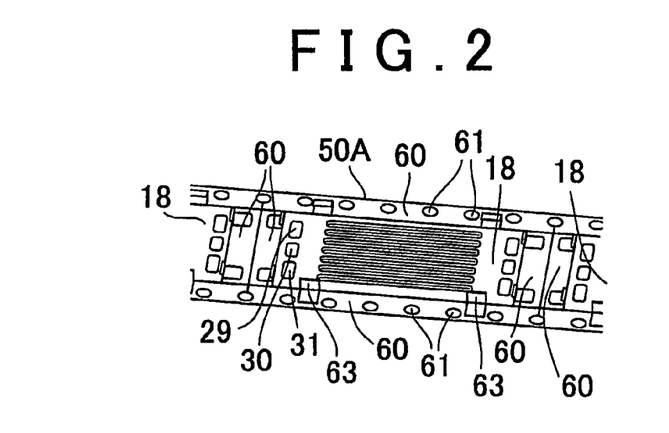
FIG. 2 is a perspective view of a separator strip.

The molding station 51 includes a mold 81 that sequentially molds the separators 18 on the strip of sheet material 50 leaving the runners 60, which are material portions other than the separators 18, as shown in FIG. 2. That is, portions corresponding to the separators 18 and portions corresponding to the runners 60 adjacent to the separators 18 are molded on the strip of sheet material 50 by the mold 81.

Figure 3:
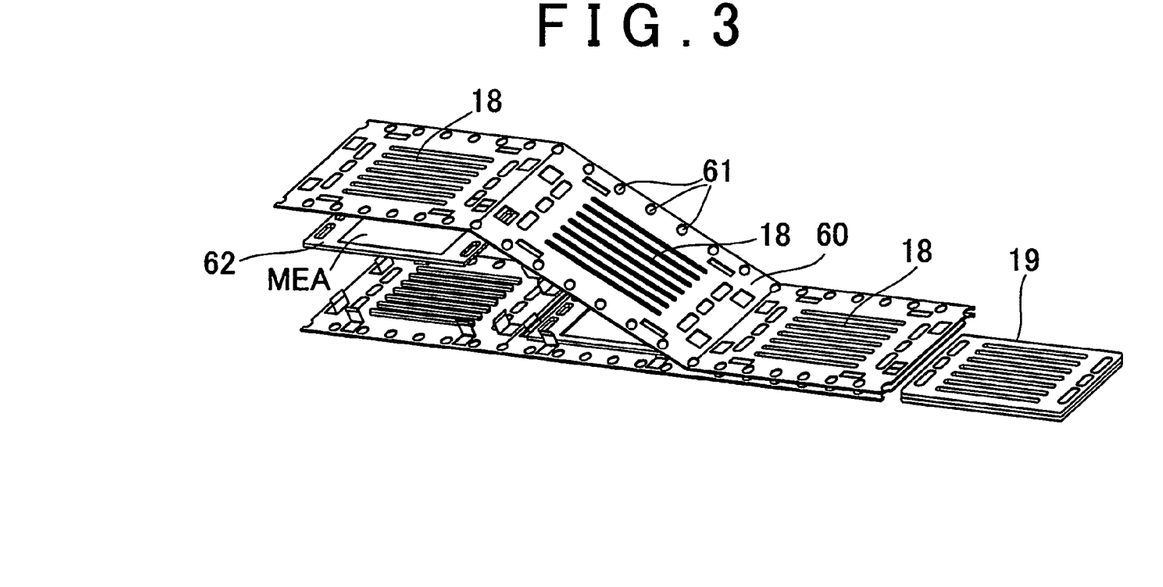
FIG. 3 is a perspective view of the separator strip from an MEA assembly process to a batch process.

The MEA assembly station 55 includes an MEA assembler 82 which sequentially assembles MEAs on a separator strip 50A (a strip of sheet material 50 after the separator and the like have been processed) in which a series of separators 18 are connected by the runners 60.

The batching station 59 includes a cutter 83 that cuts and removes the runners 60 from the module strip 50B with the MEAs sequentially assembled to the separator strip 50A (i.e., from the strip of sheet material 50 in which the modules 19 are still connected after the MEA assembly).

Figure 1B:
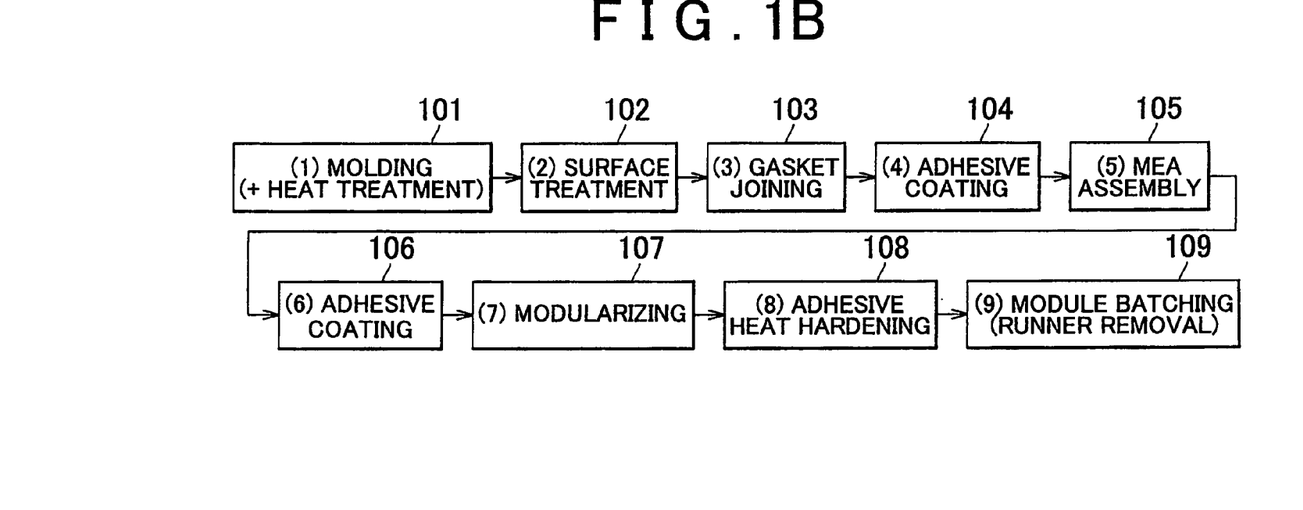
FIG. 1B is a block view of the process.

According to the fuel cell manufacturing method of this invention, the strip of sheet material 50 then proceeds unbroken to the molding process 101, the MEA assembly process 105, and the modularization process 107, after which it is separated into individual modules 19 in the batch process 109.

The fuel cell manufacturing method of this invention includes, in order of execution as the strip of sheet material 50 (including the separator strip 50A and the module strip 50B) is being conveyed, the molding process 101 of the separators 18 and the like of the strip of sheet material 50; the surface treating process 102 of the strip of sheet material 50; the joining process 103 for joining the gasket 32 to the strip of sheet material 50; the coating process 104 for coating the strip of sheet material 50 with the adhesive 33; the MEA assembly process 105 for sequentially assembling the MEAs on prede-termined portions of the strip of sheet material 50; the adhesive coating process 106 for coating the strip of sheet material 50 to which the MEAs have been assembled with the adhesive 33; the modularization process 107; the adhesive heat hardening process 108; and the batch process 109 for separating the connected modules 19 into individual modules 19 by removing the runners 60.

In the molding process 101, the separators 18 are sequentially molded on the strip of sheet material 50, and the separator strip 50A, in which the sequentially molded separators 18 are connected by the runners 60 which are material portions other than the separators 18, is produced.

In the MEA assembly and modularization processes 105 and 107, the MEAs are sequentially assembled to the separator strip 50A in which the a series of the separators 18 are connected to each other by the runners 60, and the module strip 50B, in which the series of modules 19 are connected to each other by the runners 60, is produced.

In the batch process 109, the runners 60 are cut away from the module strip 50B, thereby separating the individual modules 19.

In the molding process 101, the separators 18 are molded on the strip of sheet material 50, leaving the runners 60 on both sides, in the lateral direction, of the strip of sheet material 50. The strip of sheet material 50 is conveyed downstream of the molding process 101 while any distortion in the strip of sheet material 50 is corrected by pressing both side edges, in the lateral direction, of the runners 60 using a roller 80.

In the molding process 101, the separators 18 are molded leaving the runners 60, which are portions other than the separators 18, on both sides, in the lateral direction, of the strip of sheet material 50. At the same time, conveying/positioning holes 61 are machined in both side edges, in the lateral direction, of the runners 60 in precise positions with respect to the separators 18. The positions of the separators 18 downstream of the molding process can then be ascertained by conveying the strip of sheet material 50 using the conveying/positioning holes 61 in both side edges, in the lateral direction, of the runners 60.

Frames 62 made of insulating material are provided on the outer edge portions of the electrolyte membranes of the MEAs before the MEAs are assembled to the separator strip 50A. The frames 62 are used to position the MEAs for assembly to the separator strip 50A in the MEA assembly and modularization processes 105 and 107.

Figure 4:
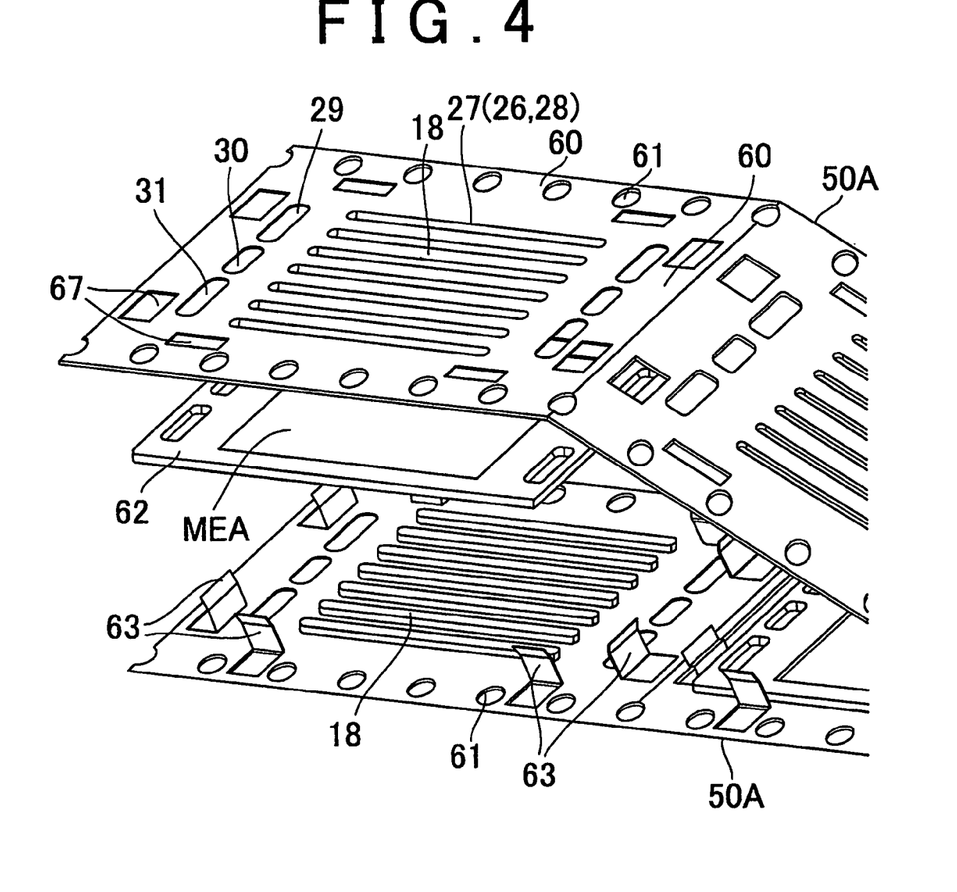
FIG. 4 is an enlarged view of the separator strip shown in FIG. 3.

In the molding process 101, assembly guides 63 are molded on the strip of sheet material 50 from that strip of sheet material 50. In the MEA assembly and modularization processes 105 and 107, the MEAs with the frames 62 are assembled after being automatically positioned in predetermined positions on the strip of sheet material 50 where the separators 18 are provided by guiding the outside edges of the frames 62 by the assembly guides 63. The assembly guides 63 may be made by cutting flaps out of the strip of sheet material 50 and bending them up, or by forming guide pins by punching or the like.

In the molding process 101, the runners, which are portions other than the separator 18, are provided between adjacent separators 18 on the strip of sheet material 50. Pitch adjusting portions 64 for adjusting the separator pitch are provided on the runners 60 between the separators 18. For example, the portions denoted by reference numeral 64 in FIG. 6 are pitch adjusting portions. The portions where the strip of sheet material 50 is slack in FIG. 1 are slack portions 65 of the strip of sheet material 50, not the pitch adjusting portions.

Bending guide portions which are less rigid than other portions are provided on the runners 60 between the separators 18 of the strip of sheet material 50. These bending guide portions are used as the pitch adjusting portions 64.

The bending guide portions are thin enough, or have a slit portion, so that they can bend through a range of 360 degrees, from +180 degrees to −180 degrees. For example, the pitch adjusting portions 64 in FIG. 6 are shown made from bent portions that protrude in the direction opposite that of the bend. However, after being bent in one direction, this type of bent portion does not easily bend in the opposite direction. Therefore, an alternative structure may be used in which, for example, a localized portion of the pitch adjusting portions 64 is thin, or stitch-like slits are made in the pitch adjusting portions 64 that will enable them to bend through the 360 degree range from +180 degrees to −180 degrees.

In the molding process 101, the runners 60, which are portions other than the separator 18, are provided on the strip of sheet material 50 between adjacent separators 18 as well as on both side edges, in the lateral direction, of the strip of sheet material 50. A raised rigid rib 66 may also be molded on the runners 60 around the entire periphery of each of the separators 18.

In the molding process 101, all of the molding of machined portions, such as the separator 18 flow path grooves, manifold holes, positioning holes 61, assembly guides 63, pitch adjusting portions 64, and ribs 66, are preferably molded in a single plastic forming process using the mold 81, but it is also possible to form them separately using several molds. For example, the flow path grooves and the manifold holes can be molded with one mold, the positioning holes 61 and the assembly guides 63 can be molded with another, and the pitch adjusting portions 64 and the ribs 66 can be molded with still another.

Also, in the molding process 101, it is preferable that i) the runners 60, which are portions other than the separators 18, be molded on the strip of sheet material 50, ii) at least one of the positioning holes 61, the bending guide portions 64 for pitch adjustment, and the ribs 66 for controlling distortion, be provided concentrated around the runners 60, and that the runners 60 be removed from the module strip 50B in the batch process 109.

The operation and effects of the portions common to each fuel cell manufacturing method and system of this invention are as follows.

In the fuel cell manufacturing method and system of the invention, the series of separators 18 with the runners 60 still on the strip of sheet material 50 proceeds in the molded state (i.e., in the state of the separator strip 50A) and still connected by the runners 60. Furthermore, batching (individual modularization) is performed by cutting and removing the runners 60 after assembly of all parts is complete. Therefore, the positional relationship of each separator 18 while the separators 18 are being conveyed is fixed so the positional relationship of the individual separators during assembly of parts such as the MEAs is fixed. As a result, it is no longer necessary to temporarily stop the conveyer line during assembly of parts so that the separators 18 can be positioned. Furthermore, the positioning time and conveying time are also reduced, which speeds up the production of the fuel cell modules.

In the fuel cell manufacturing method of this exemplary embodiment, both side edges of the runners 60 are pressed by the roller 80 so distortion of the strip of sheet material 50 can be corrected without the separators 18 being damaged as they continue to be conveyed down the line. Correcting any distortion that may have occurred in the strip of sheet material 50 makes it possible to precisely position each separator 18.

Conveying/positioning holes may also be formed in the runners 60 around the separators 18 in the strip of sheet material 50. That is, by machining the conveying/positioning holes 61 in the runners 60 on both side edges of the strip of sheet material 50 in precise positions with respect to the separators 18, and using these conveying/positioning holes 61 in both side edges of the runners 60 to convey the strip of sheet material 50 downstream of the molding process 101, it is possible to better prevent damage to the separators, as well as handle a wider variety of separators, compared to when the manifold holes in the separators 18 are used directly for conveying the separators 18. This is because different separators 18 have manifold holes of different shapes and in different positions, while the conveying/positioning holes 61, on the other hand, are able to be machined regardless of the shape and position of the manifold holes.

Also, when frames 62 (such as resin frames) of an insulating material are provided on the outer edge portions of the electrolyte membranes of the MEAs, these frame 62 can be used to position the MEAs on the separator strip 50A during assembly.

When the assembly guides 63 are made by cutting flaps out of the strip of sheet material 50 and bending them up, the MEAs with the frames 62 can be automatically positioned on portions of the strip of sheet material 50 on which the separators 18 are the provided by guiding the outer edges of the frames 62 using the assembly guides 63 in the MEA assembly and modularization processes 105 and 107. Once the frames 62 are fitted in the assembly guides 63, the MEAs will not become offset in the cell plane. As a result, the MEAs are able to be precisely assembled to the separators 18, which obviates the need to stop the strip of sheet material 50 as it is conveyed in order to position the MEAs during assembly. This in turn speeds up production of the fuel cell modules.

Pitch adjusting portions 64 may also be provided on the strip of sheet material 50 to connect adjacent runners 60 together. That is, by providing the runners 60 between adjacent separators 18 on the strip of sheet material 50 and providing the pitch adjusting portions 64 for adjusting the separator pitch on the runners 60 between the separators 18, each separator is still able to be individually positioned and precisely modularized even if there is a slight variation in separator pitch.

When bending guide portions that are less rigid than other portions are provided on the runners 60 between the separators 18 of the strip of sheet material 50, these bending guide portions 64 can be used as pitch adjusting portions, as shown in FIG. 6.

When the bending guide portions are formed so that they can bend through a range of 360 degrees, from +180 degrees to −180 degrees, the module strip 50B can easily fold like an accordion.

Ribs 66 may also be molded on the strip of sheet material 50 which extend around the peripheries of the separators 18. That is, in the molding process 101, when the ribs 66 are molded on the runners 60 around the entire peripheries of the separators 18 of the strip of sheet material 50, the separators 18 particularly the manifold portions which have little flexural rigidity) can be protected from bending during modularization and folding, such that distortion can be reduced.

Also, in the molding process 101, by performing all of the molding in a single plastic forming process using the mold 81, it is possible to form the assembly guides 63, assembly guide receiving means, and the ribs 66 in the same process in which the flow path grooves of the separators 18 are molded, which keeps the fuel cell module production time from becoming long.

Further, in the molding process 101, because the positioning holes 61, the bending guide portions 64, and the ribs 66 for controlling distortion are molded concentrated around the runners 60, and the runners 60 are removed from the modules 19 in the batch process 109, the shapes of the flow path grooves of the separators 18 are not restricted by the positioning holes 61, the bending guide portions 64, or the ribs 66 for controlling distortion.

Next, the particular technical aspects of each exemplary embodiment of the fuel cell manufacturing method of the invention will be described.

First Exemplary Embodiment

In the fuel cell manufacturing method according to the first exemplary embodiment, two strips of the sheet material 50 are supplied from a roll of material to the molding process 101, as shown in FIGS. 1 to 6.

In the molding process 101, the assembly guides 63 are molded on one of the strips of sheet material 50, while assembly guide receiving means 67, which are holes or cutouts, are molded in the other strip of sheet material 50. In the molding process 101, the conveying/positioning holes 61 are also machined in both side edges, in the lateral direction, of the runners 60 of both strips of sheet material 50.

Also, in the MEA assembly and modularization processes 105 and 107, the assembly guides 63 of the one strip of sheet material 50 are inserted into the assembly guide receiving means 67 in the other strip of sheet material 50. As a result, the assembly guides 63 are able to be kept from interfering with the other strip of sheet material 50.

Further, both strips of sheet material 50 are assembled facing one another with the respective conveying/positioning holes 61 of the runners 60 of each strip of sheet material 50 aligned (e.g., a plurality of protruding teeth are provided on the roller 80 which are inserted into the aligned conveying/positioning holes 61 of both strips of sheet material 50). As a result, modularization is able to be performed continuously without having to stop the two strips of sheet material 50 being conveyed.

Second Exemplary Embodiment

In the fuel cell manufacturing method according to a second exemplary embodiment, one strip of the sheet material 50 is supplied from a roll of material to the molding process 101, as shown in FIG. 7.

In the molding process 101, the anode side separator 18 and the cathode side separator 18 are molded alternately on a single strip of the sheet material 50.

In the MEA assembly and modularization processes 105 and 107, the MEAs are sequentially assembled to the separator strip 50A in the MEA assembly process 105, and the module strip 50B in which the modules 19 are stacked while connected by the runners 60 is produced in the modularization process 107 by folding the separator strip 50A accordion-style.

Accordingly, the module strip 50B is able to be continuously produced and folded so that the modules 19 are able to be stacked.

Then the module strip 50B is folded at the runners 60, and the runners 60 between the modules 19 of all of the modules 19 are all cut off and removed together in the batch process 109.

As a result, it is possible to efficiently remove the runners 60, and thus efficiently manufacture the modules 19.

Third Exemplary Embodiment

The fuel cell manufacturing method according to a third exemplary embodiment of the invention is essentially the same as the fuel cell manufacturing method according to the second exemplary embodiment of the invention, but differs from it in that, in the third exemplary embodiment, the module strip 50B is stacked sideways and the runners 60 are cut from the side (i.e., laterally).

In the fuel cell manufacturing method according to the third exemplary embodiment, a single strip of the sheet material 50 is supplied from a roll of material to the molding process 101, as shown in FIG. 8.

In the molding process 101, the anode side separator 18 and the cathode side separator 18 are molded alternately on the single strip of sheet material 50. The molding is shown performed using different press molds 81 to shape the flow path grooves and punch out the manifold holes.

In the surface treatment process 102, the strip of sheet material 50 with the separators 18 is cleaned and then plated with Cr, Au and coated with carbon, and dried.

In the gasket joining process 103, the rubber gasket 32 (bead) is thermo-compressed.

In the adhesive coating process 104, the seal is coated with the adhesive 33.

In the MEA assembly and modularization processes 105 and 107, the strip of sheet material 50 is bent into an accordion shape by press working, and the MEA is assembled by the MEA assembler 82. The accordion-shaped strip of sheet material 50 is then compressed and thermo-compressed at the adhesive 33 portion, and finally modularized.

The accordion-shaped module 50B is then placed on its side and the upper and lower runners 60 are cut off by the cutter 83. The operation and effects of the third exemplary embodiment are the same those of the second exemplary embodiment of the invention.

The invention claimed is:

1. A fuel cell module manufacturing method, comprising the steps of:

a molding process of sequentially molding separators out of a strip of sheet material to produce a separator strip in which a series of separators are connected together by runners which form outer frames of the separators;

an assembling/modularizing process of sequentially assembling membrane-electrode assemblies (MEAs) on the separator strip by abutting an end of the MEA against at least one assembly guide connected to the separator strip, in which the series of the separators are connected together by the runners to produce a module strip in which a series of the modules, which is formed of the separator strip on which the MEAs are assembled, are connected together by the runners, wherein the at least one assembly guide extends in a direction perpendicular to a surface of the separator strip onto which the MEA is assembled, frames made of an insulating material are provided on outer edge portions of electrolyte membranes of the MEAs before the MEAs are assembled to the separator strip, and the frames are used to position the MEAs for assembly to the separator strip;

a separating process of separating the module strip into individual modules by cutting and removing the runners from the module strip, wherein each MEA is a proton exchange membrane including an anode and a cathode disposed on opposite sides of the proton exchange membrane.

2. The manufacturing method according to claim 1, wherein, in the molding process, the separators are molded out of the strip of sheet material leaving the runners on both side edges, in the lateral direction, of the strip of sheet material, and the strip of sheet material is conveyed downstream of the molding process while distortion in the strip of sheet material is corrected by pressing both side edges, in the lateral direction, of the runners using a roller.

3. The manufacturing method according to claim 1, wherein, in the molding process, the separators are molded leaving the runners on both sides, in the lateral direction, of the strip of sheet material, while conveying/positioning holes are machined in both side edges, in the lateral direction, of the runners in precise positions with respect to the separators, and the positions of the separators downstream of the molding process can be ascertained by conveying the strip of sheet material using the conveying/positioning holes in both side edges, in the lateral direction, of the runners.

4. The manufacturing method according to claim 1, wherein:
   in the molding process, the at least one assembly guide is molded out of the strip of sheet material; and
   in the assembling/modularizing process, the MEAs with the frames are assembled after being automatically positioned in predetermined positions on the separators on the strip of sheet material by guiding the outside edges of the frames by the at least one assembly guide.

5. The manufacturing method according to claim 1, wherein, in the molding process, the runners are provided between adjacent separators on the strip of sheet material, and a separator pitch of the runners is adjusted using pitch adjusting portions provided so as to connect the runners together.

6. The manufacturing method according to claim 5, wherein bending guide portions, which have a lower flexural rigidity than other portions of the runners, are provided on the runners, and the bending guide portions are used as the pitch adjusting portions.

7. The manufacturing method according to claim 6, wherein the bending guide portions are formed thinner than the runners or are provided with slit portions such that the bending guide portions bend through a 360 degree range, from +180 degrees to −180 degrees.

8. The manufacturing method according to claim 1, wherein, in the molding process, the runners are further provided on the strip of sheet material between adjacent separators as well as on both side edges, in the lateral direction, of the strip of sheet material, and a rib is molded on the runner around the entire periphery of each of the separators.

9. The manufacturing method according to claim 1, wherein, in the molding process, all of the molding is performed in a single plastic forming process using a mold.

10. The manufacturing method according to claim 1, wherein:
    in the molding process, the runners are molded out of the strip of sheet material, and at least one from among the positioning holes, the pitch adjusting portions, the bending guide portions, and the ribs are provided concentrated around the runners; and
    in the separating process, the runners are removed from the module.

11. The manufacturing method according to claim 1, wherein:
    two strips of the sheet material are supplied to the molding process;
    in the molding process, the at least one assembly guide is molded on one of the strips of sheet material, while assembly guide receiving means, which are holes or cutouts, are molded in the other strip of sheet material, and conveying/positioning holes are machined in both side edges, in the lateral direction, of the runners of both strips of sheet material; and
    in the assembling/modularizing process, the at least one assembly guide of the one strip of sheet material is inserted into the assembly guide receiving means of the other strip of sheet material such that the at least one assembly guide is kept from interfering with the other strip of sheet material, and both strips of sheet material are assembled facing one another with the respective conveying/positioning holes of the runners of each strip of sheet material aligned, such that modularization can be performed continuously without having to stop the two strips of sheet material being conveyed.

12. The manufacturing method according to claim 1, wherein:
    one strip of the sheet material is supplied to the molding process;
    in the molding process, an anode side separator and a cathode side separator are molded alternately on the single strip of sheet material; and
    in the assembling/modularizing process, the MEAs are sequentially assembled to the separator strip, and the module strip, in which the modules are stacked while connected by the runners, is produced by folding the separator strip accordion-style.

13. The manufacturing method according to claim 12, wherein the module strip is folded at the runners and the runners between the modules of all of the modules are all cut off and removed together in the separating process.

14. The manufacturing method according to claim 1, wherein a batch process for separating all of the runners from each other is performed in the separating process.

* * * * *